United States Patent [19]

Lehnert

[11] 4,375,046
[45] Feb. 22, 1983

[54] NETWORK AND METHOD FOR CORRECTING VERTICAL NON-LINEARITY AND MIS-CONVERGENCE IN A TELEVISION PROJECTION SYSTEM

[75] Inventor: Stanley E. Lehnert, Addison, Ill.

[73] Assignee: Zenith Radio Corporation, Glenview, Ill.

[21] Appl. No.: 244,369

[22] Filed: Mar. 16, 1981

[51] Int. Cl.³ .................. H01J 29/70; H01J 29/76
[52] U.S. Cl. ..................................... 315/368; 358/60
[58] Field of Search ............ 315/368, 13 C; 358/60, 358/77

[56] References Cited

U.S. PATENT DOCUMENTS 3,745,405  7/1973  Fuse ................................. 315/13 C
4,233,547 11/1980  Gerritsen .......................... 315/368
4,300,076 11/1981  Yello ................................ 315/398

Primary Examiner—Theodore M. Blum

[57] ABSTRACT

A method and network are described for correcting vertical non-linearity and mis-convergence in a color television projection system. The correction method includes adjusting the height of the projected image so that proper convergence is attained at either the top or at the bottom of the image, and so that the opposite end of the image is stretched. The stretched end of the image is compressed to proper size and proper convergence by shunting current away from each of three vertical deflection yokes included in the projection system.

10 Claims, 6 Drawing Figures

NETWORK AND METHOD FOR CORRECTING VERTICAL NON-LINEARITY AND MIS-CONVERGENCE IN A TELEVISION PROJECTION SYSTEM

BACKGROUND OF THE INVENTION

This invention is generally directed to improvements in color television projection systems. It is particularly directed to a method for correcting vertical non-linearity in a projected image, and a linearity correction network for use therewith.

A conventional CRT (cathode ray tube) used in color television receivers includes three electron guns. For development of a centered image, each gun directs its electron beam along an axis toward the geometric center of the CRT. If the guns fire off-axis, a circular image, such as the Indian head pattern, will not be tangent to the receiver's escutcheon at all points on the image, at least not without correction.

A common cause of off-axis firing is tipping of an electron gun. If one or more guns are tipped vertically off-axis, their beams are directed either above or below the center of the CRT's screen. This is shown in FIG. 1 which illustrates a CRT having an electron gun 10 which is tipped downwardly from a desired firing axis 12. If the tipping is not corrected for, the gun's beam travels along an axis 14 and strikes the CRT's screen below center.

To correct for such off-axis firing, a centering magnet 16 is conventionally employed. This magnet redirects the trajectory of the beam along a parabolic axis 18 so that the beam strikes the center of the screen.

Although centering magnets cause the beams of the electron guns to strike the center of the screen, the beams are not necesarily coincident at the top or bottom of the screen. Vertical compression of the image at the top or bottom of the screen and vertical expansion of the image at the other end of the screen typically result from the off-axis firing of one or more electron guns. Hence, vertical mis-convergence can result and must be compensated for.

In conventional direct view CRTs, all three electron guns tend to fire along the same axis. Thus, a correction which compensates for off-axis firing of one electron gun will normally be sufficient to compensate for the off-axis firing of the other two guns. This is not true, however, in projection systems which use three separate CRTs, each having its own electron gun.

To illustrate the typical mis-convergence which off-axis firing creates in a projection system, reference is made to FIG. 2. This figure shows the mis-convergence which results from a blue electron gun which fires off-axis in an upward direction by 0.060 inches, a green electron gun which fires off-axis in a downward direction by 0.120 inches, and a red electron gun which has no vertical firing error. The centering magnets are adjusted on the blue and green guns to render all images coincident at screen center.

The total mis-convergence was split differentially between the 6 o'clock and 12 o'clock position using a vertical height adjustment to achieve best convergence. The results shown indicate that the green raster ended up above the red raster by 0.060 inches at both the top and bottom of the screen. The blue raster ended up 0.045 inches below the red raster at the top and bottom of the screen.

To reduce the illustrated mis-convergence, conventional projection systems use, in addition to centering magnets, an additional deflection yoke, waveform shaping circuitry for driving the yoke, and a large number of service controls. Even with such complication and expense, however, the controls frequently require readjustment to maintain good convergence.

OBJECTS OF THE INVENTION

It is a general object of the invention to provide an improved network and method for reducing vertical non-linearity and mis-convergence in a television projection system.

It is a more specific object of the invention to provide such a network and method wherein the number of service controls is reduced and wherein convergence, once attained, does not substantially change.

BRIEF DESCRIPTION OF THE FIGURES

The objects stated above and other objects of the invention are set forth with greater particularity in the following detailed description of the accompanying drawings, of which.

DESCRIPTION OF THE PREFERRED EMBODIMENT

Projection systems of the type under consideration employ three CRTs, each of which includes a single electron gun whose beam pattern or image is projected onto a display screen, either by rear projection or front projection optics. Conventionally associated with each CRT is a vertical height control by which each of the three images may be individually compressed or stretched.

According to the present method, the height controls are adjusted so that the three images are coincident with each other at a desired image height either at the top or at the bottom of the projected image on the screen. Coincidence at the top of the projected image is effected only when the vertical adjustment to height also causes the bottom of the projected image to be stretched beyond the desired image area. If the image coincidence at the top of the projected image results in a simultaneous compression of the projected image at image bottom, then coincidence of the three images is effected at the bottom of the projected image. In the latter case, the top of the projected image will be stretched beyond the desired image area.

Figure 1:
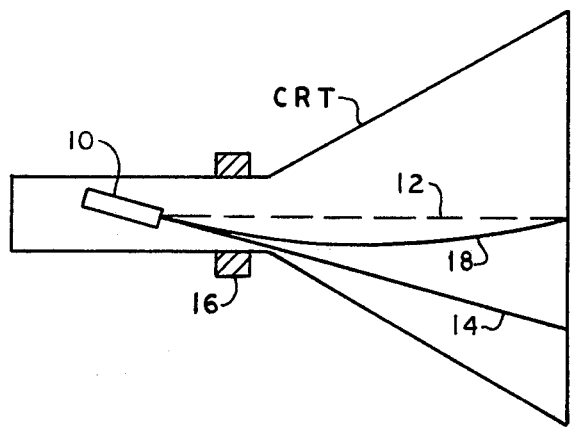
Figure 2:
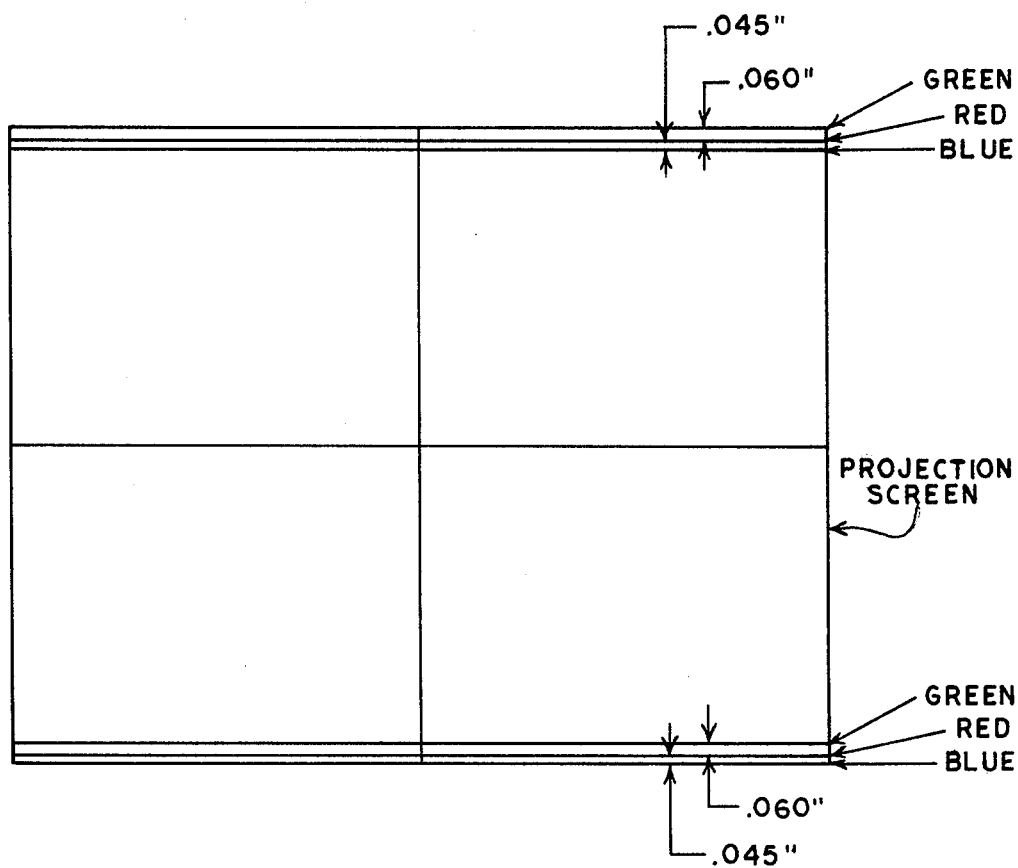
FIGS. 2 and 2, referred to above, respectively illustrate a CRT having a tipped electron gun, and the mis-convergence in a projection system which results from a pair of tipped electron guns.
Figure 3:
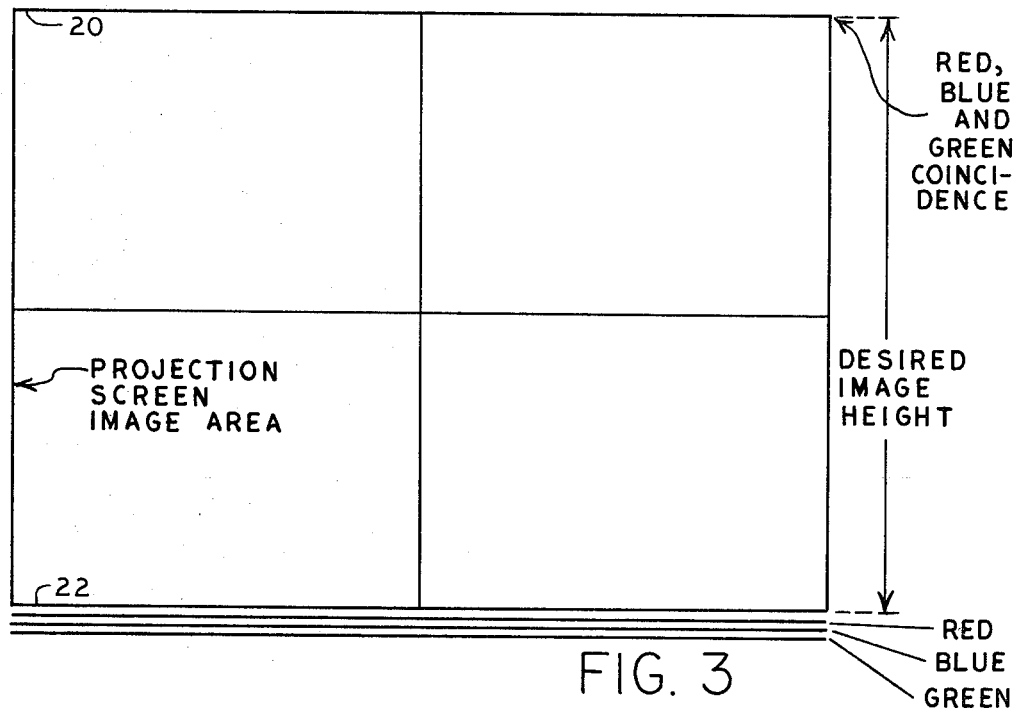
FIG. 3 shows a projection screen on which an image is compressed at its top and stretched at its bottom in accordance with one of the steps of the invention.

Suffice it to say that vertical height is adjusted so that image coincidence (perfect convergence) occurs at the end of the image (top or bottom) which is opposite the end becoming stretched as a result of the vertical height adjustment. Assume, for example, that the three images are rendered coincident at the top of the projected image as shown in FIG. 3 at the top 20 of the screen's desired image area. The red, blue and green images at the bottom of the screen extend below the desired image area and are, in the general case, not coincident with one another. Substantial mis-convergence will, therefore, be apparent at the bottom of the projection screen.

To converge the composite image at the bottom of the screen and to restore the projected image to its desired vertical height, the current in each vertical deflection yoke of a CRT is reduced such that the downwardly stretched image is compressed to the point where the three images are coincident with each other. For the example shown in FIG. 3, the currents in the vertical deflection yokes associated with the red, blue and green CRTs are each individually reduced so that the lower portion of the composite image is compressed and the red, blue and green images are coincident with each other at the bottom 22 of the projection screen's image area.

Figure 4:
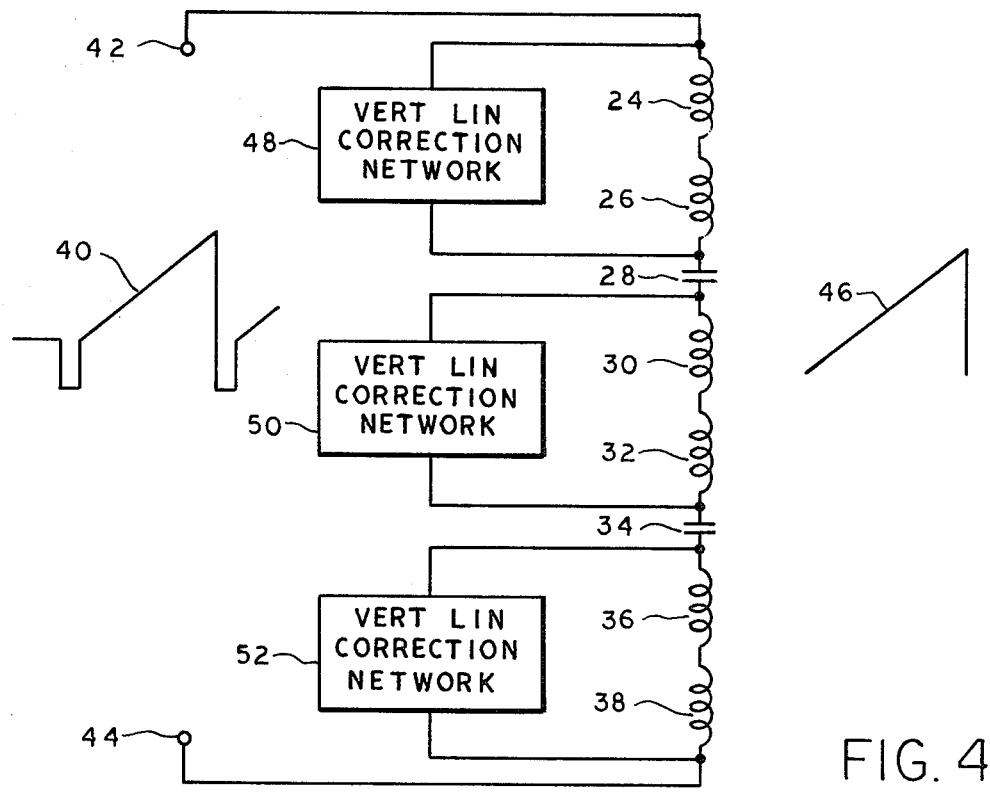
FIG. 4 illustrates the deflection coils for three CRTs in a projection system, and three vertical linearity correction circuits provided in accordance with the invention for interfacing with the deflection coils.

To explain in greater detail how the currents in the deflection yokes are preferably reduced, reference is made to FIG. 4. In this Figure, the vertical deflection yoke for one of the three CRTs is identified by coils 24 and 26. These coils are coupled via a capacitor 28 to a second vertical deflection yoke comprising coils 30 and 32. Another capacitor 34 couples the second deflection yoke to coils 36 and 38 of a third vertical deflection yoke.

The illustrated series connection of the deflection yokes is conventional with projection systems. With this arrangement, a deflection voltage, as exemplified by waveform 40, may be applied between terminals 42 and 44 to develop a deflection current through all three vertical deflection yokes. Waveform 46 is exemplary of the current carried by the three deflection yokes.

To selectively reduce the current through the deflection yoke comprising coils 24 and 26, a vertical linearity correction network 48 is coupled in parallel with coils 24 and 26. The network 48 functions to shunt a part of the current otherwise carried by the coils 24 and 26 so that the coil current is reduced in amplitude while yet retaining the substantially linear shape shown by the waveform 46. The amount of current shunted by the network 48 is manually variable so that the vertical beam deflection effected by coils 24 and 26 is easily and accurately adjusted. In the case where the coils 24 and 26 comprise the deflection yoke for the green electron beam, for example, just enough current is shunted by the network 48 to bring the bottom of the green image (FIG. 3) into coincidence with the bottom 22 of the screen's image area.

Also included is a correction network 50 for shunting the coils 30 and 32, and a third correction network 52 for shunting the coils 36 and 38. The networks 50 and 52 are preferably both similar in construction to the network 48. They are adjusted so that the red and blue images are compressed upwardly until they are coincident with the bottom of the green image at the point 22 in FIG. 3.

Figure 5:
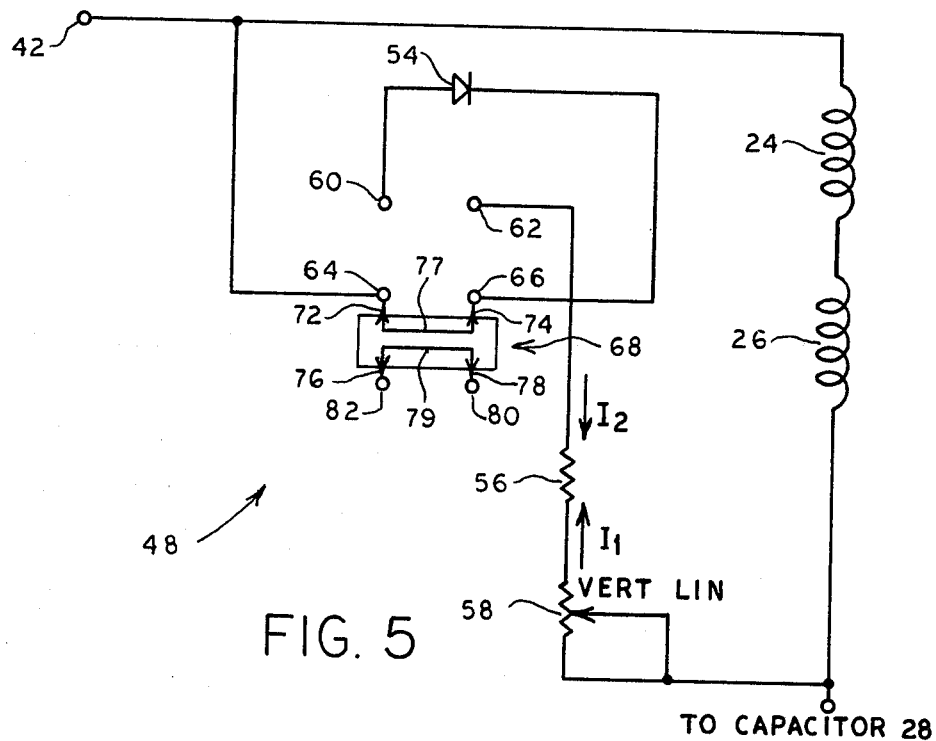
FIG. 5 shows the circuit details of a preferred embodiment of a vertical linearity correction circuit.

Referring now to FIG. 5, a circuit diagram is shown of a preferred embodiment of the correction network 48. The networks 50 and 52 have the same construction.

In parallel with the coils 24 and 26 is the series combination of a diode 54, a fixed value resistor 56 and a variable resistor 58. The latter resistor acts as a vertical linearity control to vary the amount of current shunted and thereby vary the compression of the image deflected by the coils 24 and 26.

In series with the diode 54 and the resistors 56 and 58 are four switch receptacles or contacts 60, 62, 64 and 66. A switch 68 having a rectangular body 70 has four switch inserts 72, 74, 76 and 78. A conductor 77 connects the insert 72 to the insert 74, and another conductor 79 connects the insert 76 to the insert 78. These inserts are designed to plug into the four receptacles 60, 62, 64 and 66 for completing the circuit between the diode 54 and the resistors 56 and 58 via the conductors 77 and 79. It is also preferable to include at least one additional switch receptacle 80 for mating with the insert 78 to place the switch in a "store" or unused position. In the illustrated embodiment, another switch receptacle 82 is shown for receiving the insert 76 to hold the switch body more securely in the store position.

In its illustrated position, the inserts 72 and 74 are mated with the receptacles 64 and 66, while the inserts 76 and 78 are mated with the receptacles 80 and 82. That is, those inserts are physically received by the illustrated receptacles. Thus, the conductor 77 electrically connects the receptacle 64 to the receptacle 66. However, the receptacles 60 and 62 are electrically isolated from each other. Hence, the correction network is disabled while the switch 68 is in the illustrated store position.

When it is desired to compress the top of the image deflected by the coils 24 and 26, the switch 68 is physically lifted from its store position and moved upwardly in FIG. 5 until the inserts 72, 74, 76 and 78 are in vertical alignment with the four inserts 60, 62, 64 and 66. Then the switch is pushed down so that the inserts mate with those four receptacles. This causes the conductor 77 to electrically connect the receptacle 60 to the receptacle 62. In addition, the conductor 79 electrically connects the receptacle 64 to the receptacle 66. Consequently, the diode 54 is connected in series with the resistors 56 and 58 so that the cathode of the diode 54 is electrically adjacent to the resistor 56. With this arrangement, a current $I_1$ flows in the direction indicated through the resistances 56 and 58 and through the diode 54 when the input deflection voltage forward biases the diode 54. Such forward bias of the diode 54 occurs only when the coils 24 and 26 are deflecting the upper half of the projected image. Consequently, the switch 68 should be positioned as described immediately above only when it is desired to compress the upper half of the image.

With the diode 54 connected in circuit to develop the current $I_1$, less current flows through the coils 24 and 26. However, the current carried by the other deflection coils is not affected.

Figure 6:
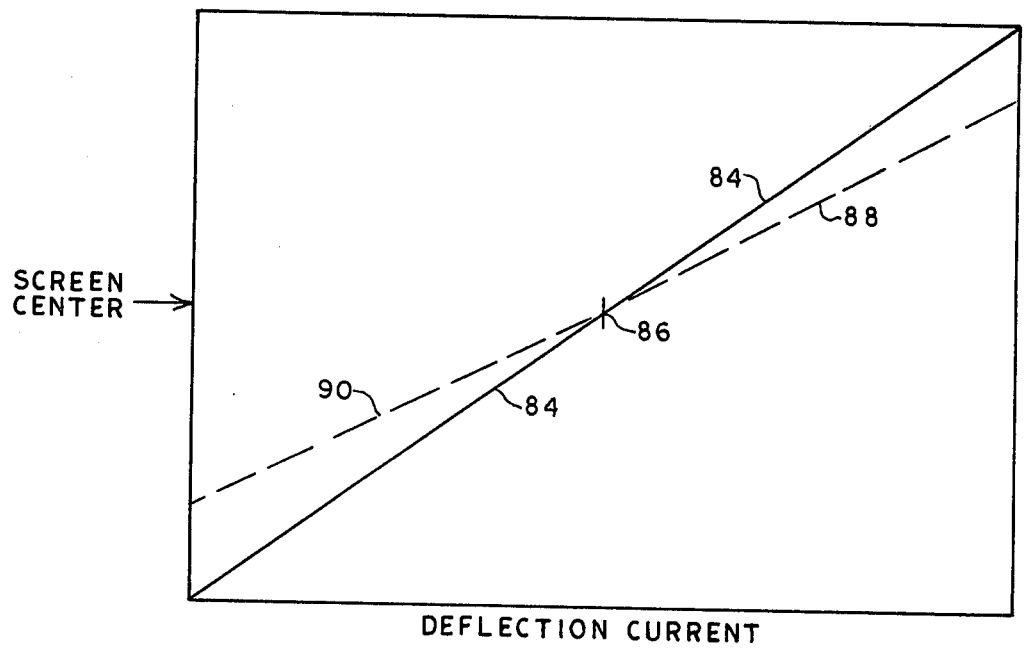
FIG. 6 is a deflection current waveform useful in describing the operation of the vertical linearity correction circuit.

FIG. 6 illustrates the effect of shunting the current $I_1$ away from the coils 24 and 26. The straight solid line 84 represents the linear current through the coils 24 and 26 when the correction network is disabled. When the switch 68 is positioned to turn the diode 54 on to compress the upper half of the image, the slope of the line 84 changes at the point 86 (indicative of screen center) due to the shunting effect of the network 48. Consequently, less current is carried by the coils 24 and 26, as indicated by the dashed line 88. It should be noted that, although the current represented by the line 88 is smaller in amplitude than the current represented by the line 84, it remains linear to insure a linear deflection.

When the lower half of the image is to be compressed, the switch 68 is physically lifted out of the receptacles 60, 62, 64 and 66, is rotated 90°, and is reinserted. This causes the insert 74 to mate with the receptacle 60 and the insert 72 to mate with the receptacle 64 so that those receptacles are electrically connected to each other by the conductor 77. In addition, the insert 78 mates with the receptacle 62 and the insert 76 mates with the receptacle 66. The conductor 79 therefore electrically connects the receptacle 62 to the receptacle 66.

This repositioning of the switch 68 causes the diode 54 to be poled in the opposite direction. Hence, when the bottom half of the image is being deflected, a current $I_2$ flows in the indicated direction to shunt current away from the coils 24 and 26. When the upper half of the image is being deflected, the diode 54 is biased off by the input deflection voltage.

As shown in FIG. 6, the repositioning of the switch 68 causes the current in the coils 24 and 26 to be reduced, as indicated by dashed line 90. Above screen center (point 86), the deflection current remains as indicated by the line 84.

Returning to FIG. 5, the resistance 58 is manually adjusted while an operator views its effect on the screen. When the image deflected by the coils 24 and 26 is compressed sufficiently to align it with the bottom of the screen's image area, the adjustment of resistor 58 is terminated.

Next, the vertical linearity controls in the networks 50 and 52 are similarly adjusted so that the other two images are converted with the previously adjusted image. Because the vertical linearity controls have no effect on the half of the image converged by the vertical height controls, the entire image now has proper vertical convergence. It will be unnecessary to reposition the switch 68 or the corresponding switches in networks 50 and 52.

Should one or more of the images be properly converged without shunting its deflection yoke, the fact will be readily apparent by observing the screen. In that case, the switch associated with that image is left in the store position shown in FIG. 5.

One of the main advantages of the invention resides in the simplicity of the correction technique and the simplicity of the correction networks. Only three linearity controls, at most, require adjustment. Moreover, once proper convergence has been achieved, it tends to remain properly set without further adjustment.

Although the invention has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

I claim:

1. For use with a color television projection system having three CRTs and three corresponding vertical deflection yokes, a method of correcting for vertical non-linearity and mis-convergence in the system's projected image, comprising:
   adjusting the height of the projected image such that one end thereof is properly converged at a desired vertical height, and the opposed end thereof is stretched beyond a desired vertical size;
   reducing the current in the deflection yoke of each CRT which develops a portion of the vertically stretched image such that the stretched portion of the image is compressed to the desired vertical height and the electron beams of the three CRTs are vertically converged.

2. A method as set forth in claim 1 wherein the projection system includes a vertical height control, and wherein the height of the projected image is adjusted by varying the vertical height control.

3. A method as set forth in claim 1 wherein the current is reduced in a deflection yoke by shunting it with a resistance in series with a diode.

4. A method as set forth in claim 3 wherein the diode is poled to shunt current from a deflection yoke only during the stretched portion of the image.

5. In a color television projection system having three CRTs and three corresponding vertical deflection yokes, a network for correcting vertical non-linearity and mis-convergence in the system's projected image, comprising:
   three adjustable shunts each disposed in parallel with a deflection yoke, and each shunt being adapted to conduct current away from its associated yoke for compressing only that portion of the image which is stretched beyond a desired vertical height.

6. A network as set forth in claim 5 wherein each shunt includes a diode in series with a variable resistance for varying the current shunted from a yoke.

7. A network as set forth in claim 6 wherein each shunt also includes a switch for reversing the polarity of the diode such that when the diode is poled in one direction, it shunts current from compressing the bottom of the projected image and when the diode is poled in the opposite direction, it shunts current for compressing the top of the projected image.

8. A network as set forth in claim 7 wherein each shunt includes first, second, third, and fourth switch receptacles, and wherein said switch includes a movable body having first, second, third, and fourth switch inserts with one conductor between the first and second switch inserts and another conductor between the third and fourth switch inserts, said switch receptacles being in circuit with the diode and the resistance such that, when the switch inserts are mated with switch receptacles in one position of the switch body, the first and second conductors pole the diode in one direction, and when the switch inserts are mated with the switch receptacles in another position of the switch body, the first and second conductors pole the diode in the opposite direction.

9. A network as set forth in claim 8 wherein each shunt includes at least one additional switch receptacle such that the switch body may be positioned so that at least one of its inserts mates with the additional switch receptacle to define a store position in which the diode is disconnected from the resistance and no current is shunted from the associated yoke.

10. In a color television projection system having three CRTs and three corresponding vertical deflection yokes, a network for correcting vertical non-linearity and mis-convergence in the system's projected image, comprising:
   an adjustable current shunt disposed in parallel with each deflection yoke, each such shunt including:
   a diode;
   a variable resistance;

a set of four switch receptacles serially coupled between the diode and the resistance; and a switch including a movable switch body, four switch inserts on the body for mating with the switch receptacles, and a pair of conductors coupling a first switch insert to a second switch insert and coupling a third switch insert to a fourth switch insert so that the switch body may be positioned to mate the four switch inserts with the four switch receptacles for poling the diode in a given direction to shunt current from its associated deflection yoke and thereby compress one end of the projected image, and so that the switch body may be differently positioned to couple its four inserts to different switch receptacles for poling the diode in the opposite direction and shunting current from its associated yoke to compress the opposite end of the projected image.

* * * * *